Aug. 3, 1965 E. S. OELKE ETAL 3,198,264

DOUBLE HEAD PISTON DOWNHOLE DRILL

Filed Sept. 17, 1962 4 Sheets-Sheet 1

INVENTORS
ERWIN S. OELKE
EWALD H. KURT
RICHARD W. BEAUMONT
BY
David W. Tibbott
ATTORNEY DOUBLE HEAD PISTON DOWNHOLE DRILL
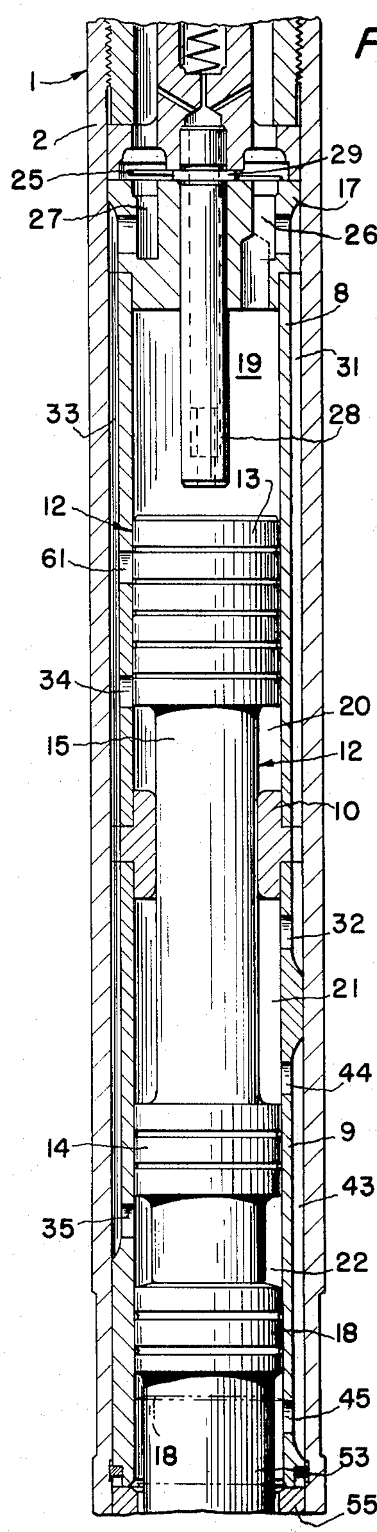
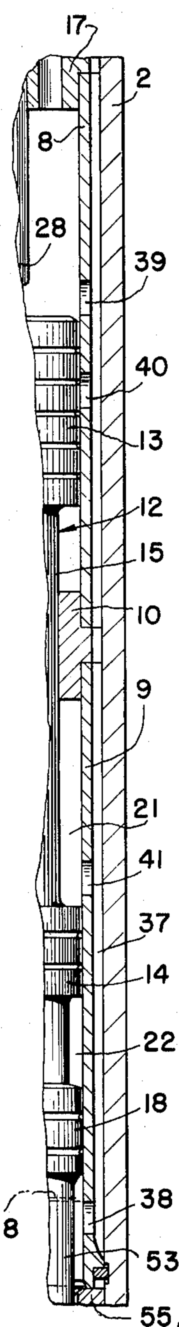
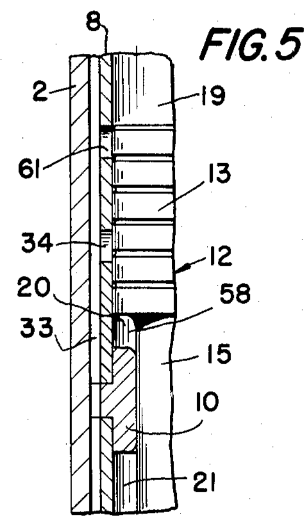
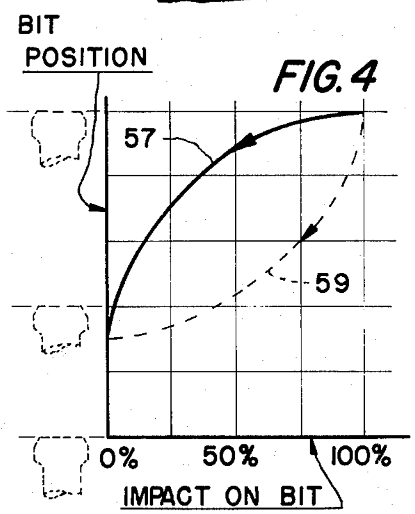
INVENTORS
ERWIN S. OELKE
EWALD H. KURT
RICHARD W. BEAUMONT
BY David W. Tibbott
ATTORNEY

DOUBLE HEAD PISTON DOWNHOLE DRILL

Filed Sept. 17, 1962

INVENTORS
ERWIN S. OELKE
EWALD H. KURT
RICHARD W. BEAUMONT
BY
David W. Tibbott
ATTORNEY

DOUBLE HEAD PISTON DOWNHOLE DRILL

Filed Sept. 17, 1962 4 Sheets-Sheet 4

INVENTORS
ERWIN S. OELKE
EWALD H. KURT
RICHARD W. BEAUMONT
BY
David W. Tibbott
ATTORNEY United States Patent Office 3,198,264
Patented Aug. 3, 1965

3,198,264

DOUBLE HEAD PISTON DOWNHOLE DRILL

Erwin S. Oelke, Easton, Pa., Ewald H. Kurt, Phillipsburg, N.J., and Richard W. Beaumont, Claremont, N.H., assignors to Ingersoll-Rand Company, New York, N.Y., a corporation of New Jersey Filed Sept. 17, 1962, Ser. No. 223,881
7 Claims. (Cl. 173—73)

This invention relates to percussion drilling apparatus of the type known as a "downhole" drill which is particularly adapted for drilling holes in rock. A "downhole" drill is a drill having a percussive mechanism which travels down a hole with the hole drilling bit.

The principal object of this invention is to provide a greatly improved "downhole" drill as compared to the drills of this type which are in use today.

Other important objects include: to provide a faster downhole drill having a higher drilling rate or speed; to provide a downhole drill having a substantially extended wear life; to provide a downhole drill which delivers impacts of increased force to its bit; to provide a downhole drill of more economical construction; to provide a downhole drill having a one piece chuck; to provide a downhole drill which automatically reduces the force of the impacts delivered to the bit as the bit moves progressively forward from the drill; to provide a downhole drill having a novel and highly advantageous means for mounting the bit on the drill; to provide a downhole drill in which drilling bits last longer; to provide a drill which progressively restricts its exhaust system as the bit moves progressively outward in the drill; to provide a drill which reduces the return stroke of its piston as the bit moves outward in the drill; to provide a drill having a multiple exhaust system; and to provide a drill which cleans cuttings from the bit splines and its chuck during its operation.

The invention is shown in the accompanying drawings wherein:

FIG. 2 is an enlarged longitudinal section of a major portion of the drill of FIG. 1 with the opposite end portions of the drill being omitted;

FIG. 3 is a fragmentary longitudinal section of the drill portion of FIG. 2 taken along a different axial plane to show some of the exhaust passages in the side walls of the drill;

FIG. 4 is a graph illustrating the reduction of impact force delivered to the drill bit as the bit moves progressively downward in the drill body to its fully extended position where it does not receive any impact force from the drill piston;

FIG. 5 is a fragmentary portion of FIG. 2 showing the upper head of the piston at the end of its downward travel when the drill is running on "cushion" and is not being struck by the piston;

Figure 1:
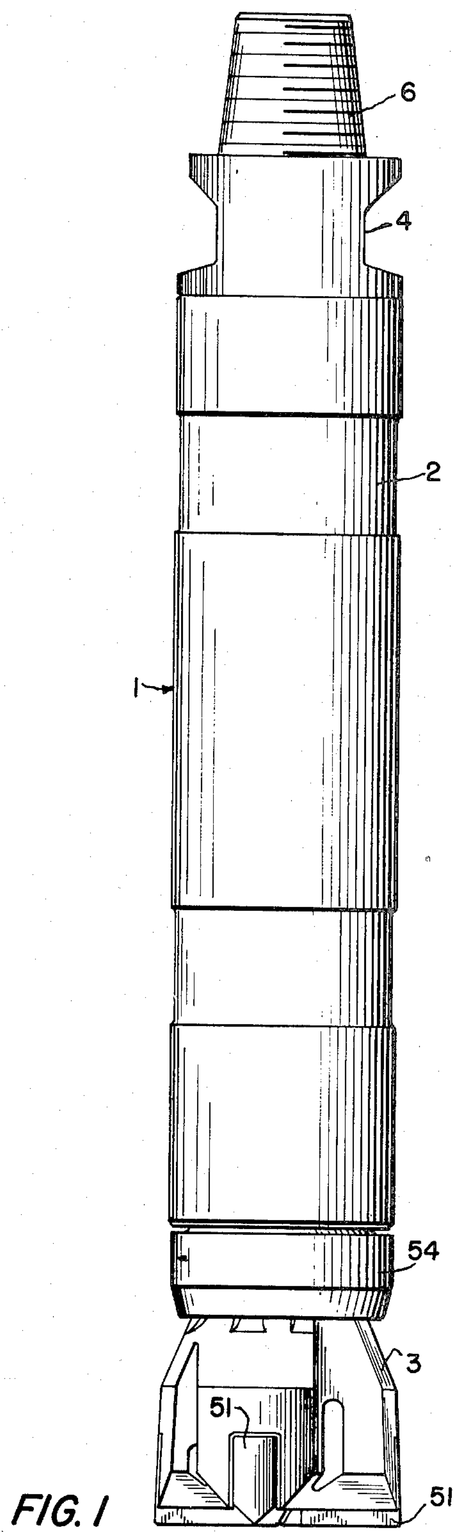
FIG. 1 is an elevational view of a downhole drill made according to this invention.
Figure 11:
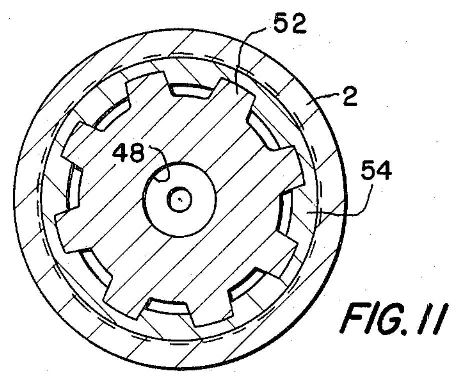
FIG. 11 is a section taken along line 11—11 of FIG. 6C.

In general, the downhole drill 1 shown in the drawings comprises an elongated outer cylindrical body or casing 2 carrying a slidably mounted bit 3 at its lower end and containing a percussive mechanism for delivering periodic impacts to the bit 3 during the drilling of a hole in the earth. The drill further includes a backhead 4 which is threaded into the upper end of the outer casing 2 and contains an axial bore 5. The backhead 4 has threads 6 at its upper end adapted to be attached to the lower end of a drill string of pipes (not shown) which supports the drill 1 in its hole and conveys pressure fluid to the axial bore 5 for operating the percussive mechanism of the drill 1.

*Percussive mechanism*

A pair of inner cylinders 8 and 9 are snugly inserted in axially aligned relationship inside of the outer casing 2. These cylinders are designated upper and lower cylinders 8 and 9, respectively, and are located in the upper and lower portions of the casing 2, respectively. The upper and lower cylinders 8 and 9 are spaced from each other by spacer ring 10 which slides into the casing 2 and abuts the adjacent ends of the two cylinders 8 and 9. The inner diameter of the spacer ring 10 is substantially smaller than the inner diameter of the two cylinders 8 and 9. The cylinders 8 and 9 and the spacer ring 10 are indexed together by a longitudinal pin 11 fitting in corresponding holes in the cylinders 8 and 9 and in the spacer ring 10, to prevent relative rotation between these three elements.

A two-headed piston 12 is slidably mounted in the cylinders 8 and 9. The piston 12 is shaped somewhat like a weight lifter's dumbbell and includes upper and lower heads 13 and 14, respectively, interconnected by an integral rod or shank 15 of smaller diameter. The piston shank 15 slides snugly in the spacer ring 10 while the two piston heads 13 and 14 slide in the respective cylinders 8 and 9.

The spacer ring 10 serves as an end wall between the adjacent ends of the upper and lower cylinders 8 and 9. The upper end of the upper cylinder 8 is closed by a flip-flop valve mechanism 17 located in the casing 2 between the upper cylinder 8 and the backhead 4. The lower end of the lower cylinder 9 is closed by a cylindrical bit anvil 18 which is slidably mounted in the lower portion of the lower cylinder 9 and integrally joined to the bit 3. This arrangement forms two pairs of piston chambers adapted to alternately receive fluid pressure for reciprocating the piston 12 back and forth. These chambers are designated 19, 20, 21 and 22, respectively, proceeding from the upper end of the drill 1 to its lower end and are labeled advancement chambers 19 and 21 and retraction chambers 20 and 22, in accordance with their function. In operation, the piston 12 is driven forward or downward by admitting fluid pressure to the advancement chambers 19 and 21 and is returned upward by admitting fluid pressure to the retraction chambers 20 and 22.

*Fluid pressure drive system*

Fluid pressure is fed to the alternate pairs of chambers 19 to 22 by the flip-flop valve mechanism 17 which is of conventional design and similar to the valve means disclosed in the U.S. Patent No. 2,942,579 of W. A. Morrison, issued June 28, 1960.

The flip-flop valve mechanism 17 includes a front plug, also designated 17, a perforated rear plate or disc 24 spaced above the plug 17 and a washer-shaped flip-flop valve vane 25 interposed between the plug 17 and the disc 24. The valve mechanism 17 is secured or clamped in the casing 2 between the backhead 4 and the upper cylinder 8. The upper cylinder 8, plug 17 and valve disc 24 are keyed together to prevent relative rotation between these members.

The flip-flop valve vane 25 is arranged to rock between alternate positions wherein fluid pressure is admitted from the axial bore 5 in the backhead 4 alternately to a pair of inlets 26 and 27 provided in the plug 17. The flip-flop valve vane 25 is provided with a V-shaped bottom face having an apex which is located midway between the inlets 26 and 27 and rests on the top end of the plug 17 to provide the rocking fulcrum for the valve vane 25.

Figure 6A:
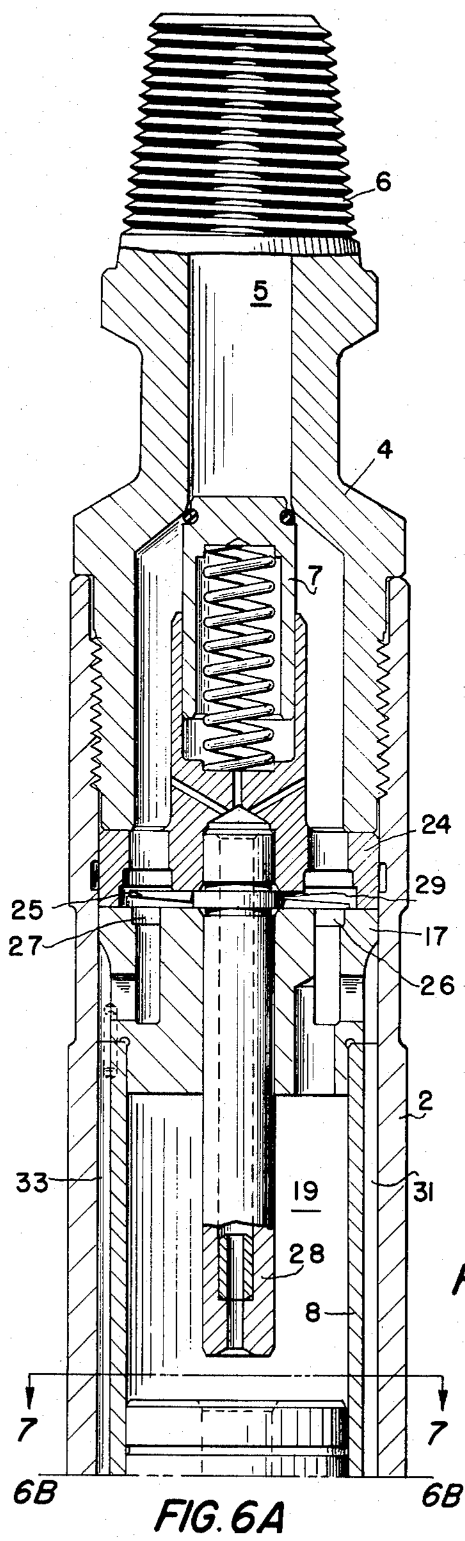
FIGS. 6A, 6B and 6C are further enlarged longitudinal sections showing broken portions of the complete drill.
Figure 6B:
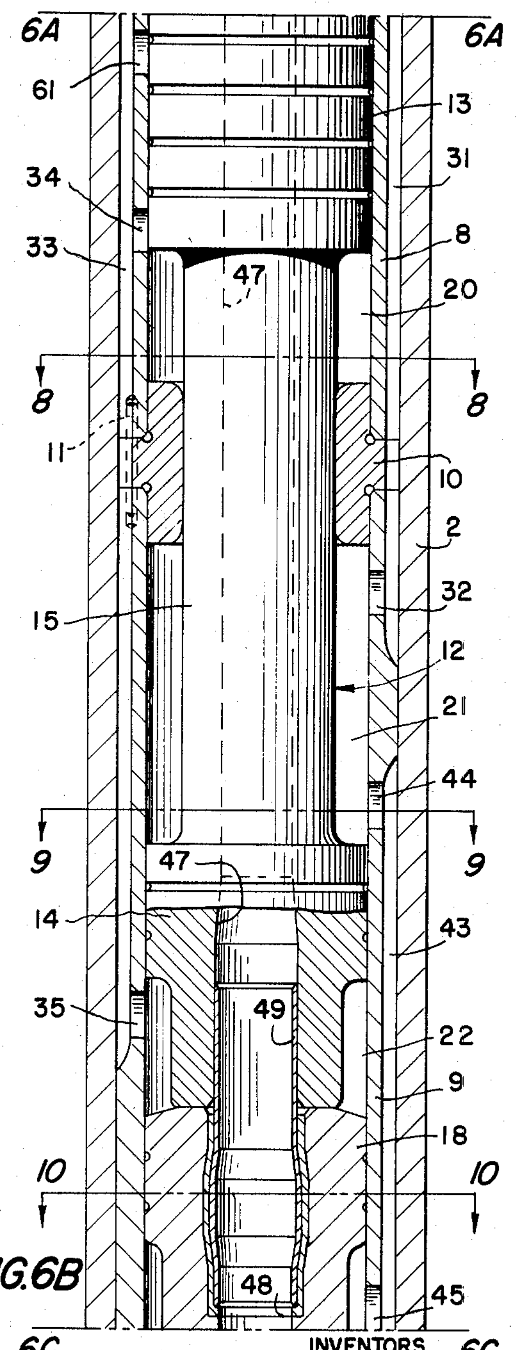

The flip-flop valve vane 25 is held in place in the drill 1 between the perforate valve disc 24 and the plug 17 and is centered therein by a central tube 28 which extends through the disc 24, the valve vane 25 and the plug 17. The central tube 28 is locked in position by being pressed into the plug 17 and having an enlarged annular ridge 29 which is secured between the disc 24 and the plug 17. As can be seen in FIG. 6A, the central tube 28 projects downwardly from the plug 17 for a substantial distance. The purpose for the projecting portion of the central tube 28 will be explained later.

The inlets 26 and 27 in the plug 17 are designated an advancement inlet 26 and a retraction inlet 27, thus distinguishing them from each other by their functions or purposes. The advancement inlet 26 opens into the upper advancement chamber 19 and also into an advancement passage 31 which runs to the lower advancement chamber 21 through an inlet port 32 provided in the cylinder 9. The advancement passage 31 is formed by a series of aligned longitudinal grooves provided on the external circumference of the upper and lower cylinders 8 and 9 and the spacer ring 10 leading to the inlet port 32. Thus, when the flip-flop valve 25 is rocked to admit fluid pressure to the advancement inlet 26, fluid pressure simultaneously flows into the pair of advancement chambers 19 and 21 to drive the piston 12 downward or forward against the bit anvil 18.

The retraction inlet 27 in the plug 17 leads to a retraction passage 33 which is formed as another series of longitudinal grooves on the cylinders 8 and 9 and the spacer ring 10 and communicates with the retraction chambers 20 and 22 by respective inlet ports 34 and 35 provided in the cylinders 8 and 9. When the flip-flop valve 25 opens the inlet 27, fluid pressure flows into the retraction passage 33 and from it simultaneously into the two retraction chambers 20 and 22 to drive the piston 12 upward away from the bit anvil 18.

Each of the four piston chambers 19 to 22 is exhausted through appropriate ports to a longitudinal exhaust passage 37, shown in FIG. 3, formed by a third series of longitudinal grooves provided on the circumferences of the cylinders 8 and 9 and the spacer ring 10. The exhaust passage 37 has an outlet 38 at its lower end which opens inwardly along the bit 3 below the bit anvil 18 whereby the exhaust air flows downwardly between the bit 3 and the lower portion of the casing 2. The upper advancement chamber 19 opens into the exhaust passage 37 by an exhaust port 39 provided in the cylinder 8, the upper retraction chamber 20 opens into the exhaust passage by an exhaust port 40 in the cylinder 8, and the lower advancement and retraction chambers 21 and 22 open into the exhaust passage 37 by a single exhaust port 41 provided in the cylinder 9. The various exhaust ports 39 to 41 are appropriately positioned so that they are uncovered by the piston 12 at the proper times during its reciprocatory travel.

A second side exhaust system is provided for the two lower piston chambers 21 and 22 by a second longitudinal exhaust passage 43, shown in FIG. 2, which is a longitudinal groove in the lower cylinder 9, below the advancement passage 31. The second exhaust passage 43 communicates with the piston chambers 21 and 22 by an exhaust port 44 and dumps the exhaust by an outlet 45 which opens inwardly along the bit 3 below the bit anvil 18, similar to the outlet 38 for the first exhaust passage 37.

A third exhaust system is further provided for the large piston chambers 19 and 22 at the opposite ends of the piston 12. The piston 12 contains a central bore 47 adapted to slidably receive the projecting portion of the central tube 28 mounted on the plug 17. The bit 3 also contains a central passage 48 leading to the lower end of the bit and a semi-flexible tube or sleeve 49 fixed therein and projecting upwardly from the bit anvil 18 to slidably enter the piston bore 47. Both the central tube 28 in the upper portion of the drill and the sleeve 49 have running fits in the bore 47 of the piston 12 and the projecting lengths of these members is selected so that as the piston 12 reciprocates, it alternately withdraws from the tube 28 or the sleeve 49 to alternately exhaust the piston chambers 19 and 22 to the lower end of the bit 3.

The operation of the piston 12 and flip-flop valve 25 is believed to be well understood in the art. The valve 25 is "current actuated" which means that it is moved or rocked between alternate positions closing one or the other of the inlets 26 or 27 by the sudden reduction of pressure in the particular inlet which is open, resulting from the air being exhausted from the piston chambers connected to that open inlet. In other words, when the valve 25 is in a position uncovering the retraction inlet 27, it admits compressed air to the retraction chambers 20 and 22, causing the piston 12 to move rearwardly. As the exhaust ports 40, 41 and 44 are uncovered by the piston 12, and the sleeve 49 is opened, the air pressure in the retraction chambers 20 and 22 and in the retraction passage 33 is suddenly lowered, creating a differential of pressure on the opposite faces of the valve 25 which snaps or rocks it closed over the inlet 27. At the same time, the upward or rearward movement of the piston 12 in the cylinders 8 and 9 compresses the air in the advancement chambers 19 and 21 which aids in snapping the valve 25 to its alternate position. In the new position of the valve 25 it opens the advancement inlet 26 and compressed air is admitted to the advancement chambers 19 and 21 through the passage 31, causing the piston 12 to reverse its movement and begin an advance stroke.

*Bit mounting*

Figure 6C:
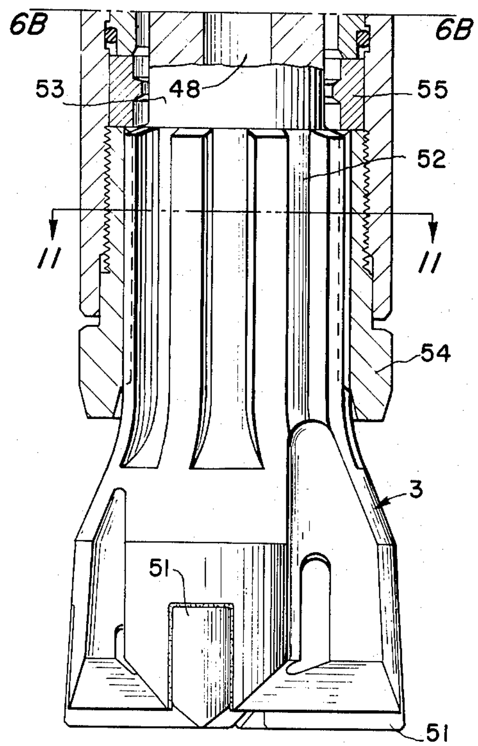
Figure 8:
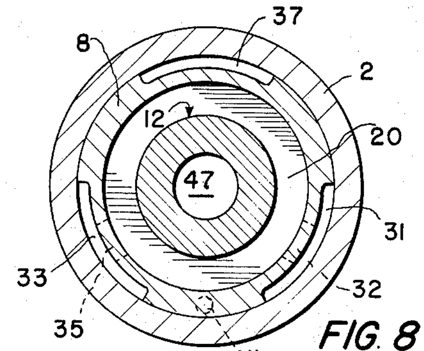
FIGS. 8 to 10 are sections taken along lines 8—8, 9—9 and 10—10, respectively, of FIG. 6B.
Figure 9:
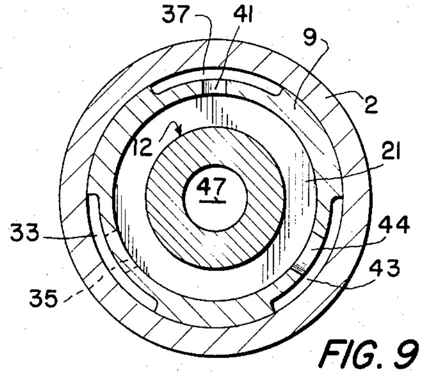
Figure 10:
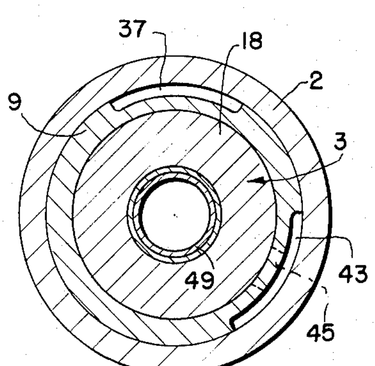
Figure 7:
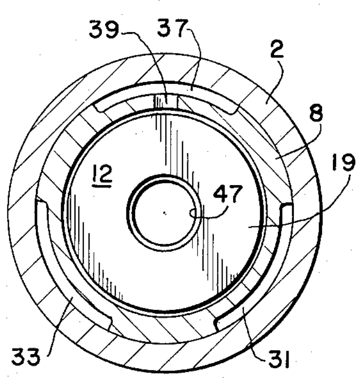
FIG. 7 is a section taken along the line 7—7 of FIG. 6A.

The construction of the bit 3 and the bit anvil 18 is shown in detail in FIG. 6C. The bit 3 includes a lower cutting end, also designated 3, carrying a plurality of tungsten carbide inserts 51 on its lower cutting face, an integral splined portion 52 located immediately above the cutting end 3 and a shank 53 of reduced diameter integrally interconnecting the splined portion 52 with the bit anvil 18. The splined portion 52 of the bit 3 is arranged to slide in corresponding internal grooves in a chuck 54 which is threaded into the lower end of the casing 2. The bit 3 is held in the drill by a split ring 55 which is locked between the chuck 54 and the lower end of the lower cylinder 9. The inner diameter of the split ring 55 is smaller than the bit anvil 18 to prevent the anvil 18 from falling out of the drill in its assembled condition. The split ring 55 is located to allow the bit 3 to slide up and down in the drill for a limited distance. Further, substantial clearance space is provided between the bit shank 53, the adjoining split ring 55, the splined portion 52 of the bit and the chuck 54 to allow the exhaust to flow downwardly along the bit 3 from the outlets 38 and 45.

It will be noted that the splined portion 52 of the bit and the inner diameter of the chuck 54 are larger than the bit anvil 18 so that, in assembling the drill, the anvil 18 will pass through the chuck 54. This construction allows the chuck 54 to be made in one piece, instead of being split which is the construction normally used in earlier drills.

*Operation*

Prior to operating the drill 1, it is attached to the bottom of a vertical drill string supported on a conventional drilling tower. The drilling tower is operative simultaneously and progressively to lower and to rotate the drill string and the attached drill during the drill operation.

After the drill 1 is secured to the drill string, the drill tower is operated to initially lower the drill 1 until the bit 3 engages the ground and is pushed upwardly into the casing 2 to its retracted position shown in FIG. 2. Compressed fluid, such as air, may be alternately introduced into the drill string before the drill bit 3 engages the ground, or after it engages the ground. In eithercase, after the drill bit 3 engages the ground and is pushed upward in the casing 2, the compressed air in the drill string and the backhead 4 drives the piston 12 up and down to periodically strike the bit 3.

The detailed operation of the drill in reciprocating the piston 12 is discussed next. It is assumed that the piston 12 is in its fully advanced position, as shown in FIGS. 2, 3 and 6A to 6C, and the flip-flop valve vane 25 is in the position shown in FIG. 6A wherein the retraction inlet 27 is open to allow compressed air to flow through the retraction passage 33, the ports 34 and 35 and into the two retraction chambers 20 and 22, thus driving the piston 12 upwardly away from the bit 3. As the piston 12 passes approximately the midpoint of its travel in the retraction direction, it uncovers the central sleeve 49 in the bit 3 and the exhaust ports 40, 41 and 44, resulting in the fluid pressure in the retraction chambers 20 and 22 dropping abruptly and the flip-flop valve vane 25 being rocked to its alternate position wherein the advancement inlet 26 is now open. Thereafter, the inertia of the piston 12 continues to carry it upwardly for a substantial distance before it stops and reverses its movement. However, it does not impact any portion of the drill at the end of its upward travel. After the piston 12 passes the inlet port 32 in the chamber 21, on its upward stroke, it traps air in the upper part of the chamber 21 which aids in stopping the piston 12.

Once the advancement inlet 26 is open, compressed air flows into the advancement chamber 19 and through the advancement passage 31 to the lower advancement chamber 21. This compressed air slows down and ultimately reverses the piston's movement. Once the piston's travel is reversed, the compressed air in the advancement chambers 19 and 21 drives the piston 12 downwardly toward the bit 3 until it strikes the bit anvil 18, thus driving the bit 3 downwardly.

During the downward movement of the piston 12, it uncovers the exhaust ports 39, 41 and 44 and the central tube 28 is withdrawn from the piston bore 47 just before the piston 12 strikes the bit anvil 18. About then the flip-flop valve vane 25 is rocked back to the position shown in FIG. 6A. Probably, there is sufficient lag in time between the uncovering of the exhaust ports and the rocking of the valve vane 25 so that the impact of the piston 12 against the bit anvil 18 occurs about the same time that the valve vane 25 is rocked to uncover the retraction inlet 27. Hence, the admission of compressed air into the retraction chambers 20 and 22 does not rob the piston 12 of its striking inertia or energy. Thereafter, the piston 12 returns upward and moves downward to strike another blow to the bit anvil 18 in the same manner as described above and this type of operation continues during the drilling of a hole.

Each time that the piston 12 strikes a blow to the bit anvil 18, the bit 3 is driven downward relative to the drill casing for a short distance, depending on the type of ground which is being drilled. If the drill is operating in hard rock, the drill bit 3 will not travel far and will return to its fully retracted position in the casing, shown in FIG. 2, before the piston 12 again strikes it. The above description of the drill operation takes place under this type of drilling condition.

The operation of the drill is somewhat different when it is drilling in broken rock. Under these conditions, the drill bit 3 tends to be caught or hung in the cracks between the rock and the continuous rotation of the drill 1 is likely to break or chip the tungsten carbide teeth 51 of the drill bit 3. In order to prevent this type of damage, the operator lifts the drill string so that part or all of the drill string weight is no longer resting on the drill 1 and so that the drill bit 3 drops forward slightly from its fully retracted position in the casing. When this happens, the force of the impact of the piston 12 against the bit anvil 18 is reduced in accordance with how far the bit is extended from the drill casing at the instant of impact. Thus, the bit 3 "pecks" at the broken rock, instead of being driven into it by a solid blow, which would happen during normal drilling conditions. This progressive reduction of impact, as the impact position of the bit varies in the drill casing, is illustrated by the solid line curve, designated 57, in FIG. 4 wherein the vertical ordinate represents the position of the bit in the casing at the moment of impact and the horizontal ordinate represents the impact force on the bit.

Eventually, when the bit 3 drops far enough out of the casing, the piston fails to strike it altogether, but simply continues to reciprocate without impacting at either end of its travel. This type of operation is called running on "cushion." It is desirable that the piston continue to reciprocate when the bit is fully extended since if it stopped, when the bit is fully extended, the drill will have to be fed down into the hole being drilled until the bit 3 is retracted in the drill and this is likely to damage the carbide inserts 51 of the bit 3.

FIG. 5 illustrates how the piston 12 can run on "cushion" without impacting the bit. As the piston approaches the end of its downward travel, it passes the inlet port 34, closes it and thereby traps air in the portion 58 of the retraction chamber 20 below the inlet port 34. This trapped air in the chamber portion 58 is compressed as its volume is reduced and serves as a dashpot to snub the forward movement of the piston 12 before it strikes the spacer ring 10. When the piston 12 stops on the trapped air in the chamber portion 58, the high pressure of this trapped air serves as a spring to aid in bouncing the piston back upwards.

As the position of the bit 3 at the moment of impact moves progressively downwards in the casing 2, the progressive reduction of the impact force delivered to the bit is caused by the combination of three different occurrences, as follows, the forward movement of the piston is snubbed, the length of the return stroke of the piston is progressively reduced and the exhaust system is progressively restricted.

The snubbing of the piston is provided by the air trapped in the chamber portion 58 as illustrated in FIG. 5 and described above. As can be easily seen, the farther downward the piston 12 can move before impact, the greater is the snubbing effect provided by the chamber portion 58.

Figure 12:
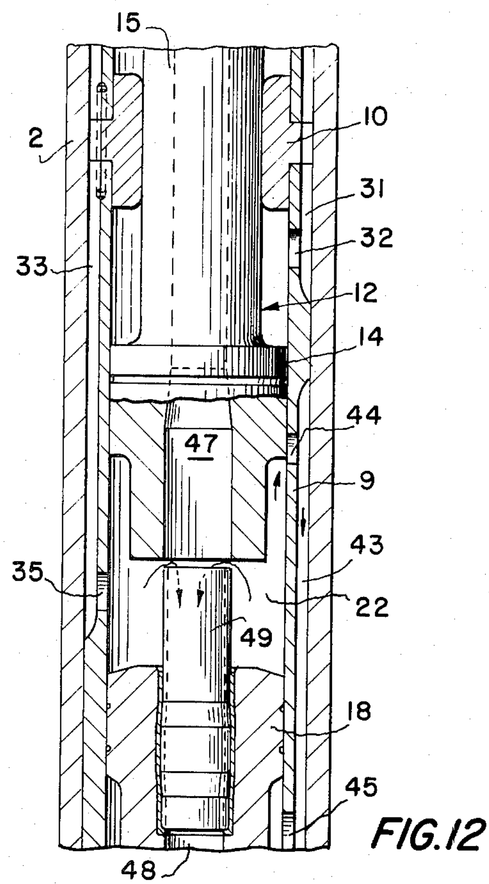
FIG. 12 is a longitudinal section of the drill showing the piston moving upwards and the lower piston chamber being exhausted simultaneously through the center of the bit and through the side passages in the lower cylinder.

The reduction in the length of the return stroke of the piston 12 is caused by the progressive downward movement of the exhaust sleeve 49 in the bit anvil 18. As the upper end of the sleeve 49 moves downward relative to the casing, the opening of the exhaust sleeve 49, as shown in FIG. 12, takes place sooner during the return movement of the piston, thereby causing the return stroke of the piston to be progressively reduced. Obviously, if the piston 12 travels over a shorter distance during the return stroke, it will have less impact energy at the end of its downward stroke.

Finally, the exhaust system is progressively restricted by the bit anvil 18 moving downward in the casing 2 to cover the exhaust outlets 38 and 45 for the exhaust passages 37 and 43, as shown by the dotted line position of the bit anvil 18 in FIGS. 2 and 3. When the outlets 38 and 45 are entirely closed, the exhaust passage 43 is inoperative and the exhaust passage 37 alternately dumps its exhaust through the exhaust ports 41 or 39 into the end chambers 19 and 22, as the piston reciprocates. The end chambers 19 and 22 continue to be exhausted through the central exhaust system formed by the axial bores in the piston 12 and the bit 3.

As pointed out previously the solid line curve 57 in

FIG. 4 represents the reduction of the impact force on the bit 3 as the bit's position, at the moment of impact, moves down in the drill. Also shown in FIG. 4 is a dotted line curve 59 which represents the manner in which conventional downhole drills reduce the impact force on the bit as the bit changes position. As can be seen, the drill of this invention reduces its impact much faster than the conventional drill, which is highly desirable to prevent undue wear and damage to the bit.

For example, when the drill is working in broken rock, the bit would be buried or embedded in the rock if the impact force were not progressively reduced as it moves out of the casing. If this happened, the continual rotation of the drill by the drill tower may cause the carbide inserts 51 of the bit 3 to be torn loose by the surrounding rock. Hence, it is very desirable to soften the impacts on the bit as it moves downward to prevent its burial in the rock or ground being drilled. Conventional drills are much more likely to bury their bits in broken rock, than is the drill of this invention.

One other port 61 is provided in the retraction passage shown in FIGS. 2 and 5. This is termed a blowing port 61 and is normally covered by the piston 12 when it is reciprocating. The only time that the blowing port 61 is in use is when it is desired to stop the piston in its fully advanced position and blow air through the end of the bit. This is carried out by shutting off the air supply to the drill 1 and lifting it upwards until the bit 3 drops to rest on the split ring 55 and the piston drops to rest on the spacer ring 10. This position of the piston opens the blowing port 61 and thereafter the admission of compressed air to the drill fails to operate the piston, but merely flows out the center exhaust system to the end of the bit 3 where it is available for cleaning purposes.

Although a preferred embodiment of the invention has been illustrated and described in detail, it will be understood that the invention contemplates other embodiments and variations of the basic invention.

Having described our invention, we claim:

1. A percussive drill apparatus comprising:

(a) a drill body including a pair of axially aligned cylinders and an interposed spacer ring between the adjacent ends of the cylinders;

(b) a piston having a pair of heads sliding in the respective cylinders and an intermediate shank sliding in said spacer ring;

(c) a bit having an anvil sliding in the outer end of one of said cylinders to close that cylinder and movable between a fully retracted position and a fully extended position in said drill body;

(d) a plug in the outer end of the other cylinder;

(e) said plug, spacer ring and bit anvil cooperating with said piston heads to form fluid pressure chambers at the opposite ends of said piston heads adapted to receive pressure fluid for reciprocating said piston and causing it to impact on said bit anvil;

(f) valve means for alternately admitting pressure fluid to the chambers at the opposite ends of each piston head;

(g) said piston and bit containing central passages serving as central exhaust passages for said fluid pressure chambers;

(h) said drill body containing a side passage located outside of said cylinders and serving as a side exhaust passage for said fluid pressure chambers; and (i) means for closing said side exhaust passage when said bit is moved to its fully extended position so that all the exhaust air flows through the central exhaust passages.

2. The drill apparatus of claim 1 wherein:

(a) said side exhaust passage has an outlet located in said drill body where a portion of said bit covers said outlet when said bit is in its fully extended position.

3. A percussive drill apparatus comprising:

(a) a drill body including a pair of axially aligned cylinders and an interposed spacer ring between the adjacent ends of the cylinders;

(b) a piston having a pair of heads sliding in the respective cylinders and an intermediate shank sliding in said spacer ring;

(c) a bit having an anvil sliding in the outer end of one of said cylinders to close that cylinder and movable between a fully retracted position and a fully extended position in said drill body;

(d) a plug in the outer end of the other cylinder;

(e) said plug, spacer ring and bit anvil cooperating with said piston heads to form fluid pressure chambers at the opposite ends of said piston heads adapted to receive pressure fluid for reciprocating said piston and causing it to impact on said bit anvil;

(f) valve means for alternately admitting pressure fluid to the chambers at the opposite ends of each piston head;

(g) means in the front fluid pressure chamber adjacent said anvil operative to vary the timing of the exhaust of air from the front pressure chamber and to progressively reduce the extent of the upward stroke of said piston as said bit is moved progressively from its fully retracted position to its fully extended position; and (h) means in another pressure chamber operative to snub and stop said piston at the end of its downward or impact stroke without said piston striking said bit anvil when said bit is in its fully extended postion.

4. A percussive drill apparatus comprising:

(a) a drill body including a pair of axially aligned cylinders and an interposed spacer ring between the adjacent ends of the cylinders;

(b) a piston having a pair of heads sliding in the respective cylinders and an intermediate shank sliding in said spacer ring;

(c) a bit having an anvil sliding in the outer end of one of said cylinders to close that cylinder and movable between a fully retracted position and a fully extended position in said drill body;

(d) a plug in the outer end of the other cylinder;

(e) said plug, spacer ring and bit anvil cooperating with said piston heads to form fluid pressure chambers at the opposite ends of said piston heads adapted to receive pressure fluid for reciprocating said piston and causing it to impact on said bit anvil;

(f) valve means for alternately admitting pressure fluid to the chamber at the opposite ends of each piston head;

(g) said anvil having substantially the same diameter as said one cylinder and capable of varying the volume of the fluid pressure chamber adjacent said anvil by sliding in said one cylinder;

(h) said bit having a splined portion;

(i) the drill body including a chuck secured to the drill body and having grooves slidably receiving said splined portion;

(j) said chuck being of one piece and having an interior of sufficient diameter for said bit anvil to pass freely through said chuck during assembly of said drill apparatus; and (k) an exhaust system having an outlet located in said drill body below the normal position of the bit anvil and above the chuck for introducing fluid to blow cuttings from the splined portion of the drill during its operation.

5. The drill apparatus of claim 4 wherein:

(a) the exhaust outlet is located to be covered by the bit anvil when the bit is fully extended from the drill body.

6. A percussive drill apparatus comprising:

(a) a drill body including a pair of axially aligned cylinders and an interposed spacer ring between the adjacent ends of the cylinders;

(b) a piston having a pair of heads sliding in the respective cylinders and an intermediate shank sliding in said spacer ring;

(c) a bit having an anvil sliding in the outer end of one of said cylinders to close that cylinder and movable between a fully retracted position and a fully extended position in said drill body;

(d) a plug in the outer end of the other cylinder;

(e) said plug, spacer ring and bit anvil cooperating with said piston heads to form fluid pressure chambers at the opposite ends of said piston heads adapted to receive pressure fluid for reciprocating said piston and causing it to impact on said bit anvil;

(f) valve means for alternately admitting pressure fluid to the chambers at the opposite ends of each piston head;

(g) said anvil having substantially the same diameter as said one cylinder and capable of varying the volume of the fluid pressure chamber adjacent said anvil by sliding in said one cylinder; and (h) an exhaust passage in the drill bit operative to reduce the upward stroke of the piston as the bit moves progressively outward from the drill body.

7. The drill apparatus of claim 6 including:

(a) a semiflexible sleeve fixed in said exhaust passage in the bit anvil and projecting above said bit anvil; and (b) a bore in said piston adapted to snugly receive said sleeve as said piston reciprocates.

References Cited by the Examiner

UNITED STATES PATENTS

| | | | |
|---|---|---|---|
| 1,612,779 | 12/26 | Mercer | 173—73 |
| 1,703,839 | 2/29 | Gilman | 173—78 |
| 2,871,826 | 2/59 | Fish et al. | 173—71 |
| 2,887,989 | 5/59 | Dulaney | 173—17 |
| 2,944,520 | 7/60 | Swanson | 173—136 |
| 2,951,467 | 9/60 | Morrison | 173—73 |
| 3,050,032 | 8/62 | Carey | 173—73 |
| 3,078,827 | 2/63 | Oelke et al. | 173—73 |
| 3,085,555 | 4/63 | Morrison | 173—78 |

BROUGHTON G. DURHAM, *Primary Examiner.*